(12) United States Patent
An et al.

(10) Patent No.: US 11,736,603 B2
(45) Date of Patent: Aug. 22, 2023

(54) PERSONAL MOBILITY AND CONTROL METHOD THEREOF

(71) Applicants: Hyundai Motor Company, Seoul (KR); Kia Corporation, Seoul (KR)

(72) Inventors: Rowoon An, Seoul (KR); Jae Yul Woo, Seoul (KR); Soobin Kim, Seoul (KR); Seunghyun Woo, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 222 days.

(21) Appl. No.: 17/464,804

(22) Filed: Sep. 2, 2021

(65) Prior Publication Data
US 2022/0131968 A1    Apr. 28, 2022

(30) Foreign Application Priority Data
Oct. 26, 2020  (KR) ................ 10-2020-0139450

(51) Int. Cl.
*H04M 1/72409* (2021.01)
*H04M 1/22* (2006.01)
*B62J 50/21* (2020.01)
*B62J 45/415* (2020.01)
*H04M 1/72454* (2021.01)

(52) U.S. Cl.
CPC ....... *H04M 1/72409* (2021.01); *B62J 45/415* (2020.02); *B62J 50/225* (2020.02); *H04M 1/22* (2013.01); *H04M 1/72454* (2021.01); *H04M 2250/12* (2013.01)

(58) Field of Classification Search
CPC .... H04M 1/6075; H04M 1/6041; H04M 1/22; H04M 2250/12; H04M 1/72454; B62J 45/415; B62J 50/225
See application file for complete search history.

(56) References Cited

U.S. PATENT DOCUMENTS 10,703,297 B1 *  7/2020  Cohen .................... B60N 3/103

FOREIGN PATENT DOCUMENTS

KR          20140020525 A  *  2/2014  ............. B62K 21/12

* cited by examiner

*Primary Examiner* — Keith Ferguson
(74) *Attorney, Agent, or Firm* — Slater Matsil, LLP

(57) ABSTRACT

A personal mobility includes a support including a holder and an awning configured to mount a user terminal, a first sensor configured to obtain illumination information, a second sensor configured to obtain road surface inclination information, and a controller configured to identify a brightness of a light corresponding to the illumination information and control a structure of the holder or the awning to be changed based on the brightness of the light and the road surface inclination information.

19 Claims, 6 Drawing Sheets

PERSONAL MOBILITY AND CONTROL METHOD THEREOF

CROSS-REFERENCE TO RELATED APPLICATIONS

This application claims the benefit of Korean Patent Application No. 10-2020-0139450, filed on Oct. 26, 2020, which application is hereby incorporated herein by reference.

TECHNICAL FIELD

The present disclosure relates to a personal mobility and a control method thereof.

BACKGROUND

With the recent rapid increase in the personal mobility market, research on personal mobility is actively conducted. In particular, there are frequent accidents while checking a smartphone while using a personal mobility, and a phenomenon in which the smartphone is difficult to see occurs frequently depending on the environment of the day when a personal mobility is used. Therefore, there is a need for an invention for easily viewing a smartphone while using a personal mobility.

Currently, research on the technology to control the brightness of the display of the smartphone itself is being conducted. However, research on controlling the brightness of a smartphone while using a personal mobility has not been properly conducted.

In particular, since this problem can be directly related to the safety of users using a personal mobility, research in this area is required.

SUMMARY

Therefore, an embodiment of the present disclosure provides a personal mobility for changing the structure of a support or adjusting the brightness of a user terminal based on the intensity of light detected by an illuminance sensor, and a control method thereof.

In accordance with one embodiment of the disclosure, a personal mobility includes a support including a holder and an awning for mounting a user terminal, a first sensor configured to obtain illumination information, a second sensor configured to obtain road surface inclination information, and a controller configured to identify a brightness of a light corresponding to the illuminance information, configured to control at least one structure of the holder or the awning to be changed based on the identified brightness of the light and the road surface inclination information.

The controller may be configured to control to increase the horizontal axis length of the awning by a predetermined length when the identified brightness of the light is greater than or equal to a predetermined brightness.

The controller, when the identified brightness is greater than or equal to a predetermined brightness based on the illumination information, is configured to adjust an angle between the user terminal and an upper surface of a main body of the personal mobility by controlling the holder in response to the identified brightness of the light.

The controller, when an inclination angle of a ground on which the personal mobility is running is changed based on the road surface inclination information, may be configured to adjust an angle between the user terminal and an upper surface of a main body of the personal mobility by controlling the holder in response to the changed inclination angle.

The personal mobility may further include a transceiver, and the controller may be configured to obtain longitudinal angle change information of the user terminal detected by an angular velocity sensor of the user terminal through the transceiver, and adjust an angle between the user terminal and an upper surface of a main body of the personal mobility by controlling the holder in response to the longitudinal angle change information.

The controller, when the identified brightness of the light detected by the first sensor is greater than or equal to a predetermined brightness based on the illumination information, is configured to control a brightness of the user terminal to increase in response to the identified brightness of the light detected by the first sensor.

In accordance with another embodiment of the disclosure, a control method of a personal mobility includes acquiring illumination information through a first sensor, identifying a brightness of a light corresponding to the illuminance information, acquiring road surface inclination information through a second sensor, and controlling at least one structure of a holder for mounting a user terminal or an awning to be changed based on the identified brightness and the road surface inclination information.

The controlling at least one structure of the holder or the awning to be changed may include controlling to increase the horizontal axis length of the awning by a predetermined length when the identified brightness of the light is greater than or equal to a predetermined brightness.

The controlling at least one structure of the holder or the awning to be changed may include, when the identified brightness of the light is greater than or equal to a predetermined brightness, adjusting an angle between the user terminal and an upper surface of a main body of the personal mobility by controlling the holder in response to the identified brightness of the light.

The controlling at least one structure of the holder or the awning to be changed may include, when an inclination angle of a ground on which the personal mobility is running is changed based on the road surface inclination information, adjusting an angle between the user terminal and an upper surface of a main body of the personal mobility by controlling the holder in response to the changed inclination angle.

The controlling at least one structure of the holder or the awning to be changed may include acquiring longitudinal angle change information of the user terminal detected by an angular velocity sensor of the user terminal through a transceiver and adjusting an angle between the user terminal and an upper surface of a main body of the personal mobility by controlling the holder in response to the longitudinal angle change information.

The control method may further include, when the identified brightness of the light is greater than or equal to a predetermined brightness, controlling a brightness of the user terminal to increase in response to the identified brightness of the light.

BRIEF DESCRIPTION OF THE DRAWINGS

These and/or other features of embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
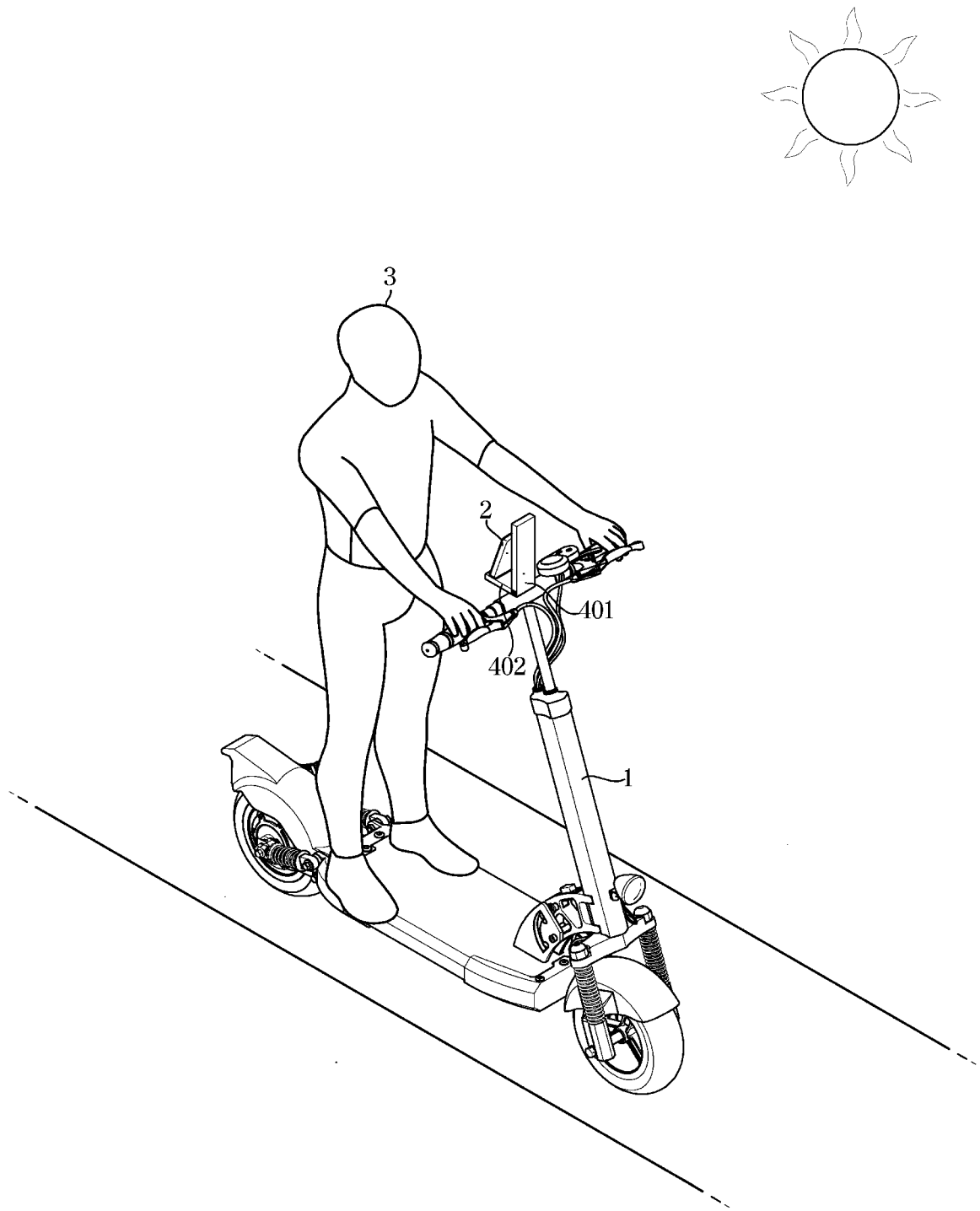
FIG. 1 is a diagram illustrating an operation of driving while riding on a personal mobility while mounting a user terminal according to an embodiment.

The same reference numerals refer to the same elements throughout the specification. This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'parts, modules, members, blocks' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

Figure 2:
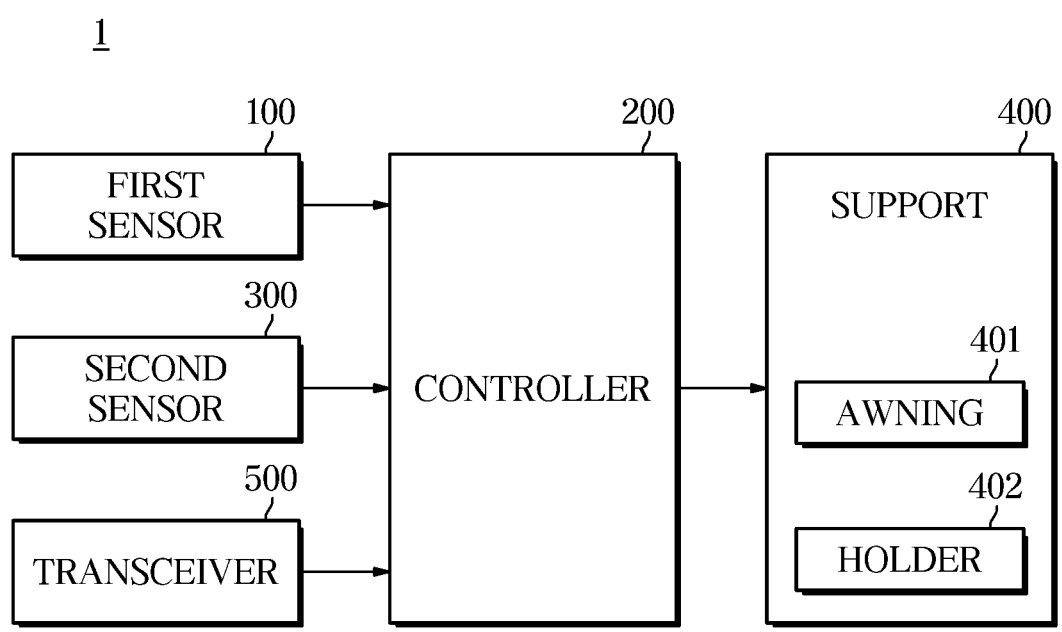
FIG. 2 is a block diagram for controlling a personal mobility according to an embodiment.

FIG. 1 is a diagram illustrating an operation of driving while riding on a personal mobility while mounting a user terminal according to an embodiment. FIG. 2 is a block diagram for controlling a personal mobility according to an embodiment. Referring to FIGS. 1 and 2 in detail, a personal mobility 1 may include a support 400 including a holder 402 and an awning 401 for mounting a user terminal 2, a first sensor 100 for acquiring illumination information, a second sensor 300 for acquiring road surface inclination information and a controller 200, when a brightness of a light detected by the first sensor 100 is greater than or equal to a predetermined brightness based on the illumination information and the road surface inclination information, for controlling at least one structure of the holder 402 or the awning 401 to be changed based on the brightness of the light detected by the first sensor 100. The predetermined brightness may be the degree to which the user 3 feels uncomfortable viewing the display of the user terminal 2 due to reflection of light or intensity of light when viewing the user terminal 2 while driving the personal mobility 1. It can be set to a variety of brightness levels.

The personal mobility 1 is a means of transportation for one person powered by electricity and may refer to an electric wheel, an electric kickboard, an electric bicycle, and a micro electric vehicle. The user terminal 2 may refer to a smartphone, and may refer to a device including a display configured for the personal mobility 1.

The holder 402 and the awning 401 may be included in the support 400. The holder 402 may be attached to the awning 401 and may be a component device forming the awning 401. The shapes of the holder 402 and the awning 401 may be generally conceivable shapes, and their positions are not limited either. The first sensor 100 may include a light source sensor and an illuminance sensor, and in addition, may mean a sensor capable of detecting light. The second sensor 300 may include a gyro sensor, a rotation angle measurement sensor, and a speed sensor, and may mean a sensor capable of measuring a road surface inclination angle. Changing the structure of at least one of the holder 402 or the awning 401 may include changing the position, shape, length, etc. of the holder 402 or the awning 401. For example, the angle of the user terminal 2 can be adjusted, the length of the user terminal 2 or the awning 401 can be adjusted, the user terminal 2 can be controlled to adjust the vertical, left and right directions, and the brightness of the display of the user terminal 2 can be adjusted. In addition, the personal mobility 1 may include a transceiver 500.

The personal mobility 1 may receive illumination information and road surface inclination information using not only the first sensor 100 and the second sensor 300, but also a gyro sensor and an illumination sensor included in the user terminal 2. Through the transceiver 500, longitudinal angle change information of the user terminal 2 detected by the angular velocity sensor of the user terminal 2 may be obtained. In addition, by controlling the holder 402 in response to the longitudinal angle change information, the angle formed between the user terminal 2 and the upper surface of the main body of the personal mobility 1 may be adjusted. At this time, detecting through the angular velocity sensor of the user terminal 2 can obtain angular changes in various directions, such as a lateral angle or a degree of inclination, in addition to a change in the longitudinal angle of the user terminal 2. That is, a change in the angular velocity of the user terminal 2 may be detected and received through the transceiver 500. The transceiver 500 may include one or more components that enable communication with an external device, and may include, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, a Zigbee communication module, and so on.

Wired communication modules include various wired communication modules such as Controller Area Network (CAN) communication modules, Local Area Network (LAN) modules, Wide Area Network (WAN) modules, or Value Added Network (VAN) modules. In addition, the wired communication module includes various cable communication modules such as USB (Universal Serial Bus), HDMI (High Definition Multimedia Interface), DVI (Digital Visual Interface), RS-232 (recommended standard 232), power line communication, or plain old telephone service (POTS).

In addition to the Wi-Fi module and the WiBro module, the wireless communication module may include a wireless communication module supporting various wireless communication methods such as Global System for Mobile Communication (GSM), Code Division Multiple Access (CDMA), Wideband Code Division Multiple Access (WCDMA), and universal mobile telecommunications system (UMTS), TDMA (Time Division Multiple Access), LTE (Long Term Evolution), etc.

The wireless communication module may include a wireless communication interface including an antenna for transmitting signals and a transmitter. In addition, the wireless communication module may further include a signal conversion module that modulates a digital control signal output from the controller into an analog type wireless signal through a wireless communication interface under control of the controller.

The wireless communication module may include a wireless communication interface including an antenna and a receiver for receiving signals. In addition, the wireless communication module may further include a signal conversion module for demodulating an analog wireless signal received through the wireless communication interface into a digital control signal.

The controller 200 may be implemented as a memory (not shown) that stores data about an algorithm for controlling the operation of components in the apparatus or a program that reproduces the algorithm, and a processor (not shown) that performs the above-described operation using data stored in a memory. In this case, each of the memory and the processor may be implemented as separate chips. Alternatively, the memory and the processor may be implemented as a single chip.

At least one component may be added or deleted corresponding to the performance of the components of the apparatus illustrated in FIG. 2. In addition, it will be readily understood by those of ordinary skill in the art that the mutual positions of the components may be changed corresponding to the performance or structure of the system.

Meanwhile, each component shown in FIG. 2 refers to software and/or hardware components such as a Field Programmable Gate Array (FPGA) and an Application Specific Integrated Circuit (ASIC).

Figure 3:
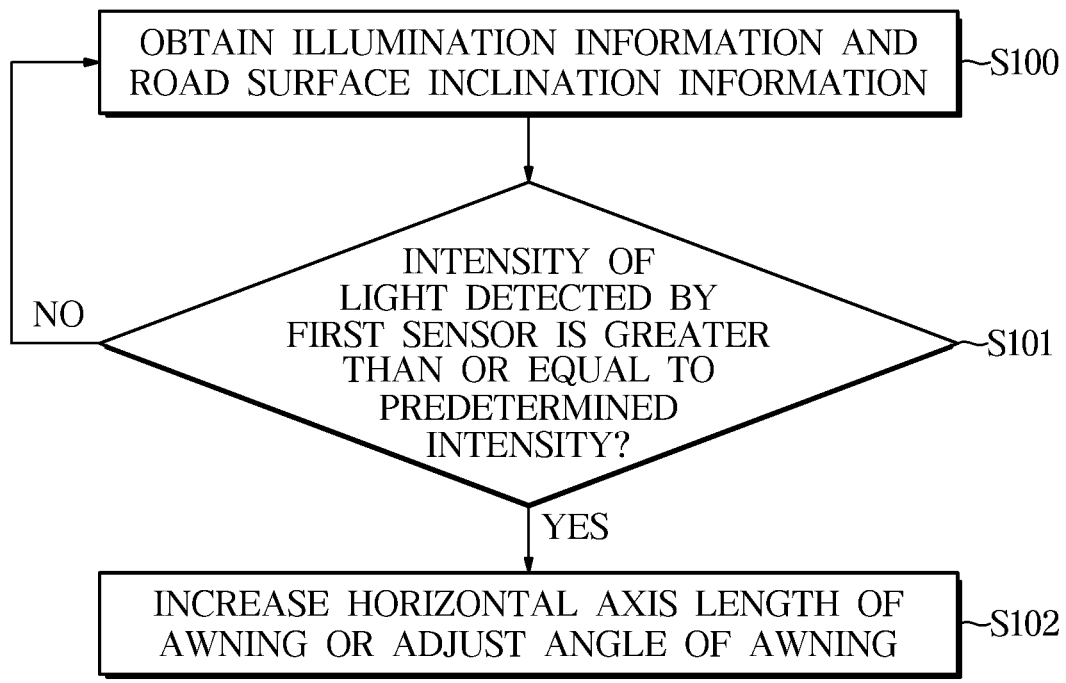
FIG. 3 is a diagram illustrating an operation of increasing a horizontal axis length of an awning or adjusting an angle of an awning according to an embodiment.

FIG. 3 is a diagram illustrating an operation of increasing a horizontal axis length of an awning or adjusting an angle of an awning according to an embodiment.

Referring to FIG. 3 in detail, the controller may control to increase the horizontal axis length of the awning by a predetermined length when the brightness of the light detected by the first sensor is greater than or equal to the predetermined brightness. In addition, the controller, when an intensity of the light detected by the first sensor is greater than or equal to the predetermined brightness based on the illumination information, may adjust an angle between the user terminal and an upper surface of a main body of the personal mobility by controlling the holder in response to the intensity of the light detected by the first sensor. First, it is possible to obtain illumination information and road surface inclination information (S100), and determine whether the intensity of light detected by the first sensor is greater than or equal to a predetermined intensity (S101). If it is not more than the predetermined intensity, illumination information and road surface inclination information are continuously obtained. If it is more than a predetermined intensity, it can be controlled so that the horizontal axis length of the awning is increased or the angle of the awning is adjusted (S102). The horizontal axis length of the awning may mean the length of the vertical axis of the awning. The predetermined distance may mean a distance sufficient to block light, which may be specified by the user and may already be systemized. Also, depending on the intensity of light, the horizontal axis length of the awning may increase by various distances. In addition, if the intensity of light detected by the first sensor is greater than or equal to a predetermined intensity, the angle and position of the user terminal may be changed by changing the position of the holder or rotating the holder. In this case, the main body of the personal mobility may refer to a part on which the user is stepping in FIG. 1, and may refer to a main body that is generally considered.

Figure 4:
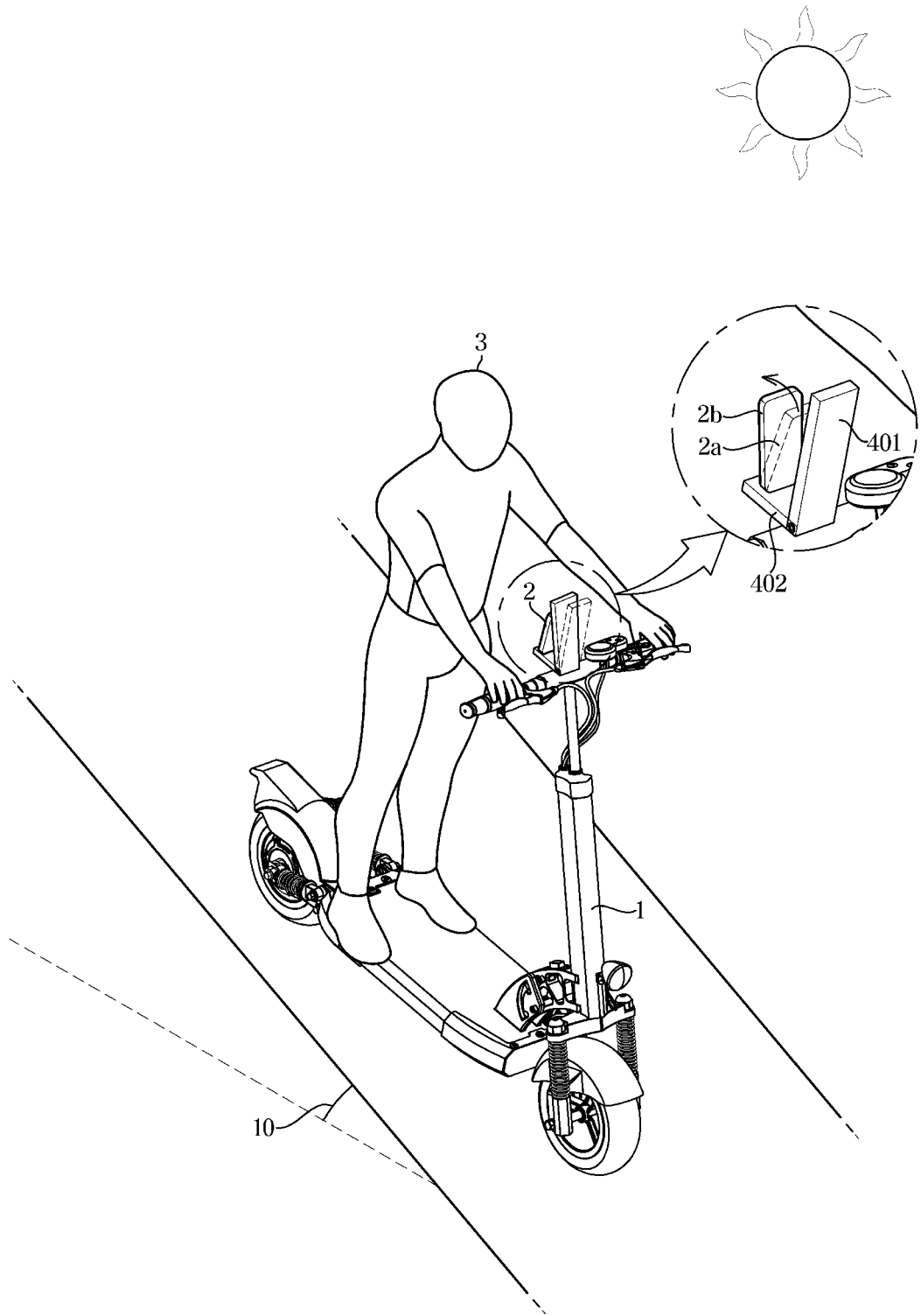
FIG. 4 is a diagram illustrating an operation of adjusting an angle of a user terminal by controlling a holder according to an angle of an inclined surface according to an embodiment.

FIG. 4 is a diagram illustrating an operation of adjusting an angle of a user terminal by controlling a holder according to an angle of an inclined surface according to an embodiment.

Referring to FIG. 4 in detail, when an inclination angle of a ground on which the personal mobility 1 is running is changed based on the road surface inclination information, the controller may adjust an angle between the user terminal 2 and an upper surface of a main body of the personal mobility 1 from the existing 2*a* toward the user 2*b* by controlling the holder in response to the changed inclination angle 10. When adjusting the angle of the user terminal 2 and the upper surface of the main body of the personal mobility 1 by controlling the holder in response to the changed inclination angle 10, the angle between the user terminal 2 and the upper surface of the main body of the personal mobility 1 may be the same as the inclination angle, may be proportional to the inclination angle, and may mean an angle different from the inclination angle. In addition, the angle between the user terminal 2 and the upper surface of the main body of the personal mobility 1 may be set to a specific angle. This is because the amount of light shining on the user terminal 2 is large, so it may not be easy for the user 3 to see the user terminal 2 since the angle between the user terminal 2 and the upper surface of the main body of the personal mobility 1 also changes according to the inclination angle when the personal mobility 1 is driving downhill.

Figure 5:
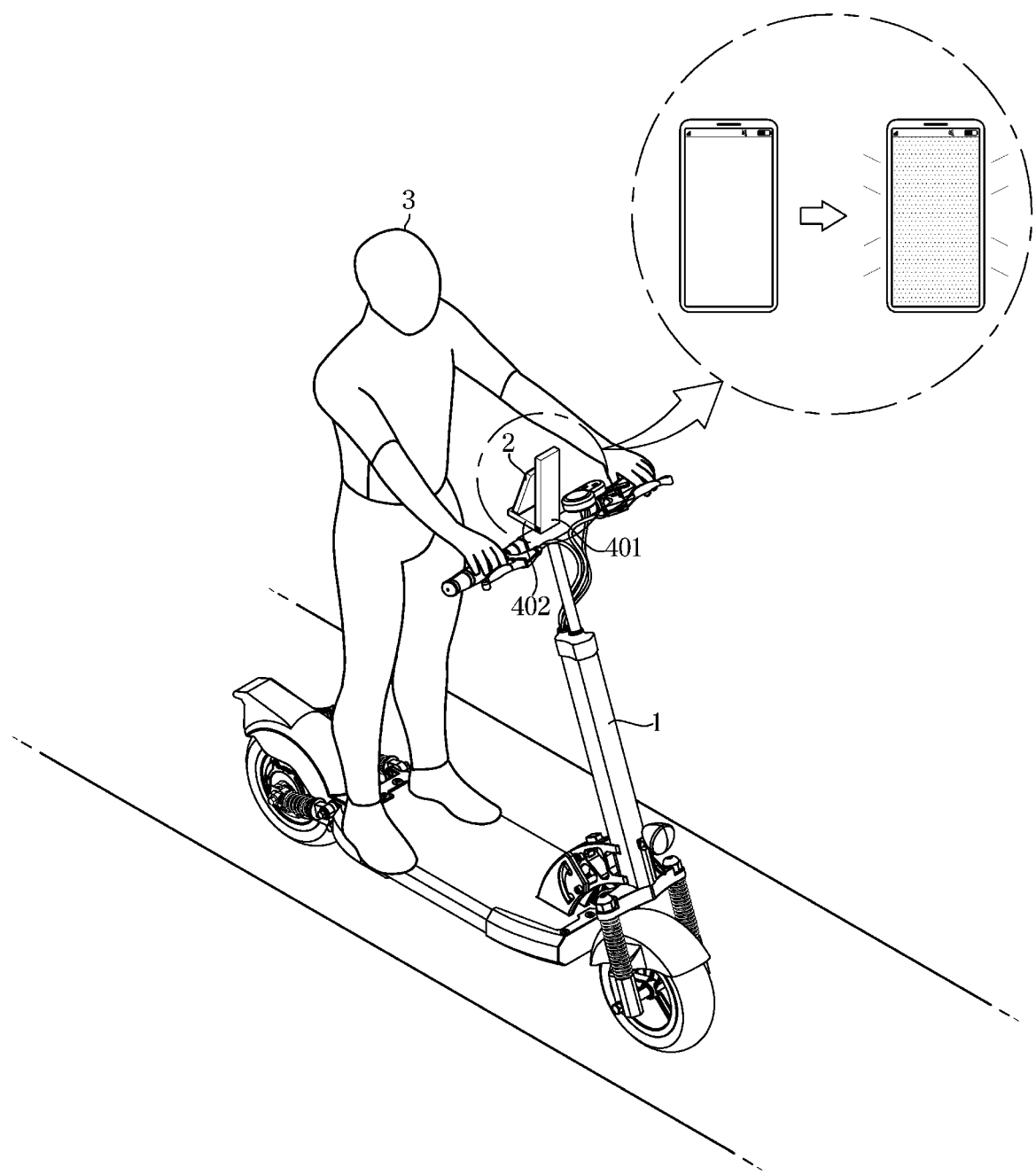
FIG. 5 is a diagram illustrating an operation of adjusting brightness of a user terminal according to illuminance according to an embodiment.

FIG. 5 is a diagram illustrating an operation of adjusting brightness of a user terminal according to illuminance according to an embodiment.

Referring to FIG. 5 in detail, when an intensity of the light detected by the first sensor is greater than or equal to the predetermined brightness based on the illumination information, the controller may control a brightness of the user terminal 2 to increase in response to the intensity of the light detected by the first sensor. When the intensity of light detected by the first sensor is greater than or equal to a predetermined intensity, the structure of the awning 401 or the holder 402 may be changed. However, the brightness of the display of the user terminal 2 may be brightly adjusted so that the user 3 can see the user terminal 2 well. At this time, the degree to which the brightness of the user terminal 2 is adjusted may be proportional to the intensity of light detected by the first sensor, and the degree may be set in various ways.

Figure 6:
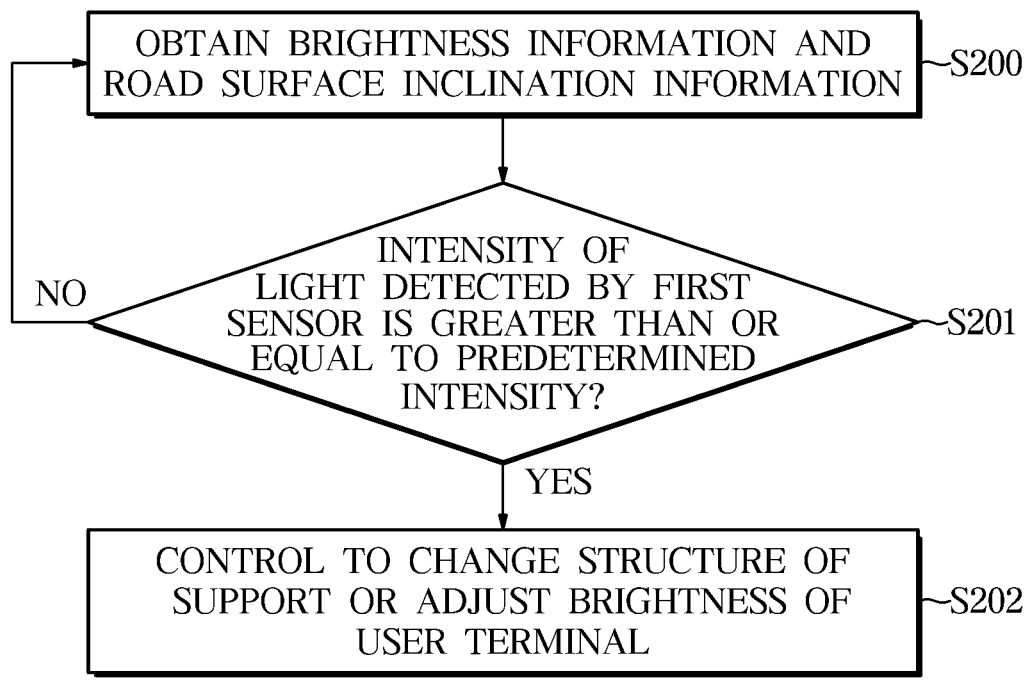
FIG. 6 is a flow chart according to an embodiment

FIG. 6 is a flow chart according to an embodiment. Referring to FIG. 6 in detail, brightness information and road surface inclination information may be obtained through a first sensor and a second sensor (S200). Thereafter, it may be determined whether the intensity of light detected by the first sensor corresponds to a predetermined intensity or more (S201). The predetermined intensity may mean a predetermined intensity of brightness. If the intensity of light detected by the first sensor is not more than a predetermined intensity, brightness information and road surface inclination information can be continuously obtained. In addition, when the intensity is more than a predetermined intensity, the controller can control to change the structure of the support or adjust the brightness of the user terminal. Changing the structure of the support may mean changing the structure of at least one of the awning or the holder.

Embodiments of the present disclosure provide a personal mobility and a control method thereof that enable a user to view a user terminal without inconvenience by changing a structure of a support or adjusting the brightness of a user terminal based on the intensity of light detected by an illuminance sensor.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The disclosed embodiments are illustrative and should not be construed as limiting.

What is claimed is:

1. A personal mobility comprising:
   a support comprising a holder and an awning configured to mount a user terminal;
   a first sensor configured to obtain illumination information;
   a second sensor configured to obtain road surface inclination information; and
   a controller configured to identify a brightness of a light corresponding to the illumination information and control a structure of the holder or the awning to be changed based on the brightness of the light and the road surface inclination information.

2. The personal mobility of claim 1, wherein the controller is configured to control to increase a horizontal axis length of the awning by a predetermined length when the brightness of the light is greater than or equal to a predetermined brightness.

3. The personal mobility of claim 1, wherein the controller is configured to adjust an angle between the user terminal and an upper surface of a main body of the personal mobility by controlling the holder in response to the brightness of the light when the brightness of the light is greater than or equal to a predetermined brightness based on the illumination information.

4. The personal mobility of claim 1, wherein the controller, based on a change in an inclination angle of a ground on which the personal mobility is running based on the road surface inclination information, is configured to adjust an angle between the user terminal and an upper surface of a main body of the personal mobility by controlling the holder in response to the change in the inclination angle.

5. The personal mobility of claim 1, further comprising a transceiver, wherein the controller is configured to:
   obtain longitudinal angle change information of the user terminal detected by an angular velocity sensor of the user terminal through the transceiver; and
   adjust an angle between the user terminal and an upper surface of a main body of the personal mobility by controlling the holder in response to the longitudinal angle change information.

6. The personal mobility of claim 1, wherein the controller is configured to control a brightness of the user terminal to increase in response to the brightness of the light detected by the first sensor, when the brightness of the light detected by the first sensor is greater than or equal to a predetermined brightness based on the illumination information.

7. A control method of a personal mobility, the control method comprising:
   acquiring illumination information through a first sensor;
   identifying a brightness of a light corresponding to the illumination information;
   acquiring road surface inclination information through a second sensor; and
   controlling a structure of a holder for mounting a user terminal or an awning to be changed based on the brightness of the light and the road surface inclination information.

8. The control method of claim 7, further comprising determining that the brightness of the light is greater than or equal to a predetermined brightness.

9. The control method of claim 8, wherein controlling the structure of the holder or the awning to be changed comprises controlling to increase a horizontal axis length of the awning by a predetermined length.

10. The control method of claim 8, wherein controlling the structure of the holder or the awning to be changed comprises adjusting an angle between the user terminal and an upper surface of a main body of the personal mobility by controlling the holder in response to the brightness of the light.

11. The control method of claim 8, further comprising controlling a brightness of the user terminal to increase in response to the brightness of the light.

12. The control method of claim 8, further comprising determining an inclination angle of a ground on which the personal mobility is running is changed based on the road surface inclination information.

13. The control method of claim 12, wherein controlling the structure of the holder or the awning to be changed comprises adjusting an angle between the user terminal and an upper surface of a main body of the personal mobility by controlling the holder in response to the changed inclination angle.

14. The control method of claim 8, wherein controlling the structure of the holder or the awning to be changed comprises:
   acquiring longitudinal angle change information of the user terminal detected by an angular velocity sensor of the user terminal through a transceiver; and
   adjusting an angle between the user terminal and an upper surface of a main body of the personal mobility by controlling the holder in response to the longitudinal angle change information.

15. A personal mobility comprising:
   a support configured to mount a user terminal, the support comprising a holder and an awning;
   a first sensor configured to obtain illumination information;
   a second sensor configured to obtain road surface inclination information;
   a transceiver; and
   a controller configured to:
      identify a brightness of a light corresponding to the illumination information;
      determine the brightness of the light is greater than or equal to a predetermined brightness; and
      control to increase a horizontal axis length of the awning by a predetermined length or control to adjust an angle between the user terminal and an upper surface of a main body of the personal mobility by controlling the holder in response to the brightness of the light.

16. The personal mobility of claim 15, wherein the controller is configured to determine a change in the inclination angle of a ground on which the personal mobility is running based on the road surface inclination information.

17. The personal mobility of claim 16, wherein the controller is configured to adjust the angle between the user terminal and the upper surface of the main body of the personal mobility by controlling the holder in response to the change in the inclination angle.

18. The personal mobility of claim 16, wherein the controller is configured to:
   obtain longitudinal angle change information of the user terminal detected by an angular velocity sensor of the user terminal through the transceiver; and
   adjust the angle between the user terminal and the upper surface of the main body of the personal mobility by controlling the holder in response to the longitudinal angle change information.

19. The personal mobility of claim 16, wherein the controller is configured to control a brightness of the user terminal to increase in response to the brightness of the light detected by the first sensor.

* * * * *